(12) United States Patent
Capers, Jr. et al.

(10) Patent No.: US 7,398,980 B2
(45) Date of Patent: Jul. 15, 2008

(54) SELF-LEVELING WHEELBARROW

(76) Inventors: Seth Murph Capers, Jr., 1717 Broadmoor, Roanoke, TX (US) 76262; Seth Murphy Capers, 18338 Amanda La., Saucier, MS (US) 39574

( * ) Notice: Subject to any disclaimer, the term of this patent is extended or adjusted under 35 U.S.C. 154(b) by 127 days.

(21) Appl. No.: 11/294,994

(22) Filed: Dec. 6, 2005

(65) Prior Publication Data
US 2006/0170197 A1  Aug. 3, 2006

Related U.S. Application Data

(63) Continuation-in-part of application No. 10/769,989, filed on Feb. 2, 2004, now Pat. No. 7,134,676.

(60) Provisional application No. 60/633,513, filed on Dec. 6, 2004, provisional application No. 60/443,961, filed on Jan. 31, 2003.

(51) Int. Cl.
*B62B 1/00* (2006.01)

(52) U.S. Cl. .................... 280/47.31; 280/47.32; 298/2

(58) Field of Classification Search .............. 280/47.3, 280/47.31, 47.32, 78, 653; 298/3, 2
See application file for complete search history.

(56) References Cited

U.S. PATENT DOCUMENTS

| | | | |
|---|---|---|---|
| 2,960,182 A * | 11/1960 | Swanson ................. 182/200 |
| 4,185,623 A | 1/1980 | Volkov et al. |
| 4,243,122 A * | 1/1981 | Coutts ................. 182/200 |
| 4,456,095 A * | 6/1984 | Hodson ................. 182/200 |
| 4,994,030 A | 2/1991 | Glowczewskie et al. |
| 5,531,791 A | 7/1996 | Wolfinbarger, Jr. |
| 6,099,025 A * | 8/2000 | Rohrs ................. 280/659 |
| 6,159,246 A | 12/2000 | Mendes et al. |
| 6,613,278 B1 | 9/2003 | Mills et al. |
| 6,649,072 B2 | 11/2003 | Brandt et al. |
| 6,886,838 B1 * | 5/2005 | Zimmerman ......... 280/47.31 |
| 6,991,251 B2 * | 1/2006 | Tomchak et al. ........ 280/653 |
| 7,134,676 B2 * | 11/2006 | Capers et al. ......... 280/47.31 |
| 2004/0227314 A1 * | 11/2004 | Black, Jr. ............. 280/47.31 |
| 2005/0012285 A1 * | 1/2005 | Davis ................. 280/47.31 |
| 2005/0218614 A1 * | 10/2005 | Black ................. 280/47.31 |

OTHER PUBLICATIONS

Sketches and disclosure of Applicant's earlier prototype (approximately 1990-1995) (7 pages).

* cited by examiner

*Primary Examiner*—Hau V Phan
(74) *Attorney, Agent, or Firm*—Laura G. Barrow

(57) ABSTRACT

The inventive self-leveling wheelbarrows include novel locking mechanisms for maintaining the wheelbarrow at a horizontally level position relative to the underlying terrain.

21 Claims, 21 Drawing Sheets

PRIOR ART

Top View

Rear View

SELF-LEVELING WHEELBARROW

This application claims the benefit of the filing of co-pending U.S. provisional application Ser. No. 60/633,516, filed Dec. 6, 2004, and which is incorporated by reference herein in its entirety. This application is also a continuation-in-part of U.S. Ser. No. 10/769,989, filed Feb. 2, 2004 and issued Nov. 14, 2006 as U.S. Pat. No. 7,134,676, which in turn claims the benefit of Ser. No. 60/443,961, filed Jan. 31, 2003, all of which are incorporated by reference herein in their entireties.

BACKGROUND AND SUMMARY OF THE INVENTION

The present invention is directed to improvements of a product innovation referred to as a "self-leveling wheelbarrow," and which are also described in the inventors' pending patent application, U.S. Ser. Nos. 10/769,989 and 60/443,961. The wheelbarrow incorporates self-adjusting legs which conform to the terrain and lock into place when at rest on the ground. The self-leveling feature offers added stability and provides a significant advantage over conventional wheelbarrows when used on sloping or uneven terrain.

Conventional wheelbarrows are well suited for use on smooth, level surfaces. Their ease of use, excellent mobility, and low cost have made them the material handling equipment of choice for moving small loads in the construction and landscaping industries. As a result of the great success of the conventional wheelbarrow, their basic design has remained essentially unchanged for many years.

However, due to its high center of gravity, fixed leg assembly, and the inherent instability of a tripod-style base, the use of a conventional wheelbarrow on uneven or sloped terrain is somewhat restricted. These factors result in a tendency to overturn if the legs are not resting on a level surface. When level ground cannot be found in close proximity to the working area the worker may be forced to park the wheelbarrow some distance away. The additional walking between the wheelbarrow and the working area during loading or unloading reduces worker productivity. When parked on uneven or sloping terrain, extra care must be taken to avoid overturning and potential injury to the user. Often a wedge or block is placed beneath one leg in order to provide additional stability and prevent overturning. These common problems associated with conventional wheelbarrows are illustrated in FIG. 1.

A simple solution has been devised which greatly improves the stability of a wheelbarrow on sloping or uneven ground and eliminates its tendency to overturn. A self-adjusting mechanism has been added to the leg assembly, allowing the legs to conform to the terrain as the wheelbarrow is lowered and locked into position when both legs are in contact with the resting surface. The self-leveling action increases stability and maintains the wheelbarrow in a level position. The center of gravity remains very nearly centered above the midpoint of the legs, thus the weight is more evenly distributed between the legs, and the tendency to overturn is diminished.

The present invention is directed to a self-leveling wheelbarrow comprising (a) a basin having a front end, a rear end, a left side and a right side; (b) a wheel disposed beneath the basin near said front end; (c) a handle assembly secured to the basin; and (d) a rear mounting bracket secured near the rear end of the basin, the mounting bracket having a top end secured beneath the basin. In certain aspects, the present invention further includes (a) a leg assembly comprising a pair of legs secured to one another by a centrally disposed plate, such that one of the pair of legs is positioned beneath the right side of the basin and the other one of the pair of legs is positioned beneath the left side of the basin, the plate further having a centrally disposed, arcuate top edge and a set of teeth arranged along the top edge; (b) a means for movably securing the leg assembly plate to the rear mounting bracket, such that the leg assembly may rotate in a counterclockwise or clockwise direction and in a vertical direction relative to the rear mounting bracket; and (c) a locking component secured beneath the basin and positioned above the top edge of the leg assembly plate, wherein the locking component is a C-channel member having a pair of adjacent side walls extending downward, each of the side walls further having a tapered edge; and whereby as the leg assembly contacts the underlying ground as the wheelbarrow is parked, the leg assembly rotates about the rear mounting bracket to accommodate the contour angle of the ground, sliding the top edge of the plate within the locking component to thereby engage the tapered edges of said locking component within adjacent teeth of the top edge of the leg assembly plate, thereby further locking the plate therein to prevent the leg assembly from rotating further, either in a clockwise direction of travel or a counterclockwise direction of travel. In certain embodiments, the locking component may be secured to the rear mounting bracket. In addition, each of the side walls of the locking component may include a notch, each notch further including the tapered edge for engagement between adjacent teeth of the top edge of the leg assembly plate when the locking component is engaged with the top edge of the leg assembly plate.

In addition to the basin, wheel, handle assembly, rear mounting bracket, and means for movably securing the leg assembly plate to the rear mounting bracket described above, other aspects of the present invention include (a) a first locking component secured to the leg assembly, the first locking component comprising an elongated inverted U-shaped member having two opposing ends, each of the ends secured to one of the rear legs, and a central portion disposed between the opposing ends; and (b) a second locking component secured beneath the basin and above the central portion of the first locking member, the second locking component comprising a first bar having a slot configured to engage therein the central portion of the first locking component. In operation, as the leg assembly contacts the underlying ground as the wheelbarrow is parked, the leg assembly rotates about the rear mounting bracket to accommodate the contour angle of the ground, sliding the central portion of the first locking component within the slot of the second locking component, thereby locking the central portion of the first locking component therein to prevent the leg assembly from rotating further, either in a clockwise direction of travel or a counter-clockwise direction of travel. In other aspects of this embodiment, the second locking component may further include a second bar adjacent the first bar, the second bar having a slot configured to engage therein the central portion of the first locking component, with the slots of the first and second bars being in registration with one another. In addition, the second locking component may secured to the rear mounting bracket.

In addition to the basin, wheel, handle assembly, rear mounting bracket, and means for movably securing the leg assembly plate to the rear mounting bracket described above, other aspects of the present invention also include (a) a first locking component secured to the leg assembly, the first locking component comprising an inverted elongated U-shaped member having two opposing ends, each of the ends secured to one of the rear legs, and a central portion disposed between the opposing ends, the first locking component further including a series of holes penetrating through the first locking component; and (b) a second locking component secured beneath the basin above the first locking component, the second locking component comprising a locking pin configured for engagement within one of the holes of the first locking component. In operation, as the leg assembly contacts the underlying ground as the wheelbarrow is parked, the leg assembly rotates against the rear mounting bracket to accommodate the contour angle of the ground, sliding the central portion of the first locking component upwards for engagement of the locking pin within one of the holes, thereby locking the central portion of the first locking component therein to prevent the leg assembly from rotating, either in a clockwise direction of travel or a counterclockwise direction of travel. In other aspects of the present invention, the holes of the first locking component may be a series of rectangular shaped notches penetrating an outer edge of the first locking component, and wherein the locking pin is a rectangular tab configured for locking engagement within one of the notches. In this embodiment, as in the embodiments described above, the second locking component may be secured to the rear mounting bracket.

The means for movably securing the leg assembly plate to the rear mounting bracket may include a vertical slot provided in the rear mounting bracket and a pin extending from the leg assembly plate, the pin slidably engaged within the vertical slot to allow the leg assembly to move vertically within the slot and to rotate in a clockwise and counterclockwise direction about the pin. Alternatively, the means for movably securing the leg assembly plate to the rear mounting bracket may include a vertical slot provided in the leg assembly plate and a pin extending from the rear mounting bracket, the pin also engaged within the vertical slot of the leg assembly plate to allow for similar vertical and rotational movement of the leg assembly plate against the rear mounting bracket.

DETAILED DESCRIPTION OF THE INVENTION

Several embodiments are described herein; however, the general operation of each embodiment is similar and described in co-pending application Ser. No. 10/769,989. In summary, mounting brackets are affixed beneath the wheelbarrow basin B, preferably to the handle assembly H. A lower leg assembly 4 is attached to the mounting brackets in a manner such that it is free to pivot relative to the mounting brackets, wheelbarrow handles, and body. This allows the leg assembly to rotate to match the contour of the ground. When the wheelbarrow is in its final resting position, a locking device is either manually or automatically engaged to prevent rotation of the legs relative to the wheelbarrow body and the desired position is maintained.

Figure 1:
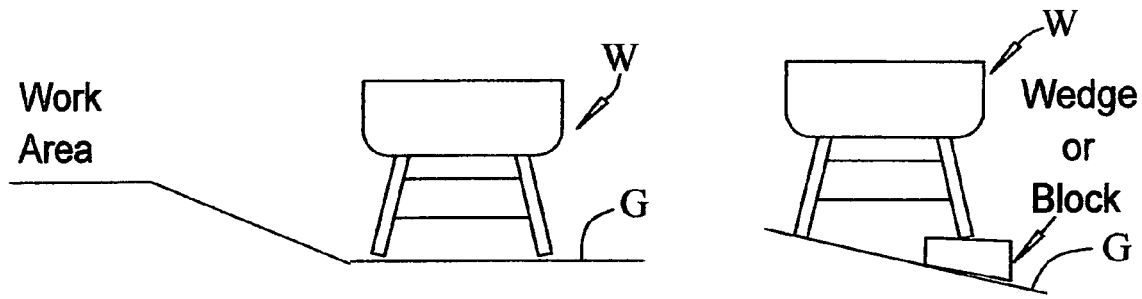
FIG. 1 is a schematic illustration of a conventional wheelbarrow parked on sloping terrain.
Figure 2:
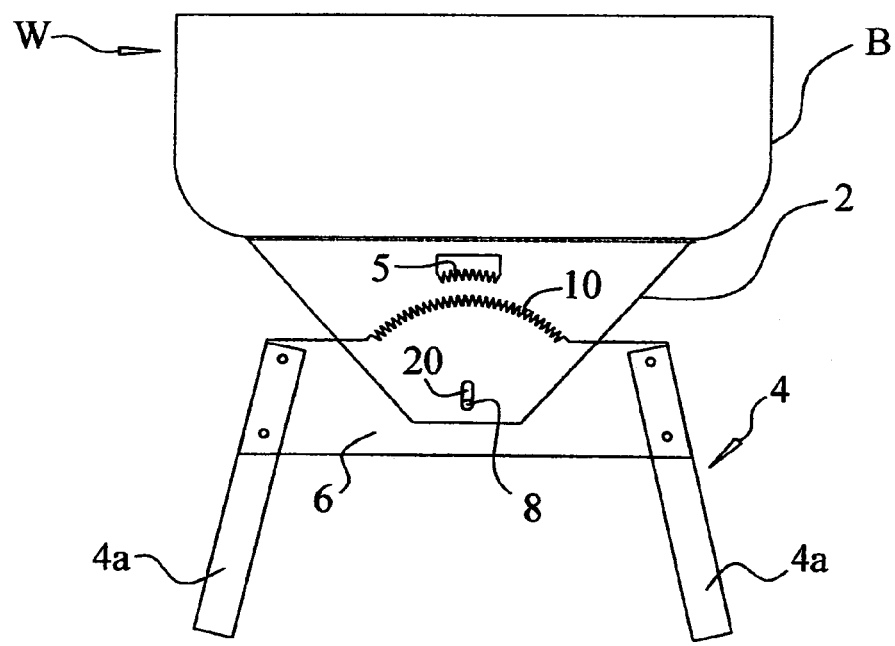
FIGS. 2-7 are rear views of one embodiment of the wheelbarrow design comprising features of the wheelbarrow design of the present invention.

The self-adjusting leg assembly allows the user to park the wheelbarrow W in a much wider range of terrain conditions. The need to use a wedge or block beneath a leg or to park the wheelbarrow a great distance from the working area is eliminated (FIG. 1). When parked on uneven terrain, the weight is more evenly distributed between the legs, resulting in greater stability and reduced tendency to overturn. As a result, worker productivity and safety are substantially improved.

One embodiment of the present invention utilizes a vertical slot 20 in the rear mounting bracket 2, a set of locking teeth 10 on the rotating leg assembly 4, and a means to engage the corresponding teeth on the mounting bracket 2. This embodiment is presented here to form the baseline for other embodiments described later, and is illustrated in FIGS. 2-7. This embodiment is also the Applicants' original design, and is disclosed in Applicants' provisional application Ser. No. 60/633,516, non-provisional application 10/769,989 (now U.S. Pat. No. 7,134,676) and original provisional application Ser. No. 60/443,961. This embodiment comprises of a lower leg assembly 4 (i.e. set of legs 4a joined by a plate 6) which is free to pivot via a pin 8 extending from the leg plate 6 and through a vertical slot 20 in the rear mounting bracket 2. [Alternatively, the vertical slot 20 may be provided in the leg assembly plate 2 and the pin 8 extending from the rear mounting bracket 2. For ease of explanation, however, the figures illustrate the former design.] This allows the leg assembly to rotate until the legs 4a match the contour of the ground G. The top edge of the leg plate 6 has a set of teeth 10 forming an arc with its center at the pivot point. The rear mounting bracket 2 has a matching set of one or more locking teeth 5 positioned a small distance above those of the leg plate 6. (Note in FIG. 2 that the teeth on the rear mounting bracket and the upper edge of the leg plate are positioned behind the rear mounting bracket. These features, however, are only visible in FIG. 2 for ease of illustration). This matched set of locking teeth may be formed within or integral with the rear mounting bracket 2, or they may be a part of a separate locking component that is fastened separately to the mounting bracket prior to use. Alternatively, as shown in FIG. 10, this separate locking component may simply comprise a C-channel member 15 having adjacent side walls 16 with edges 17 sufficiently ground down (i.e. tapered edge) to engage the teeth 10 of the leg plate 6.

Figure 3:
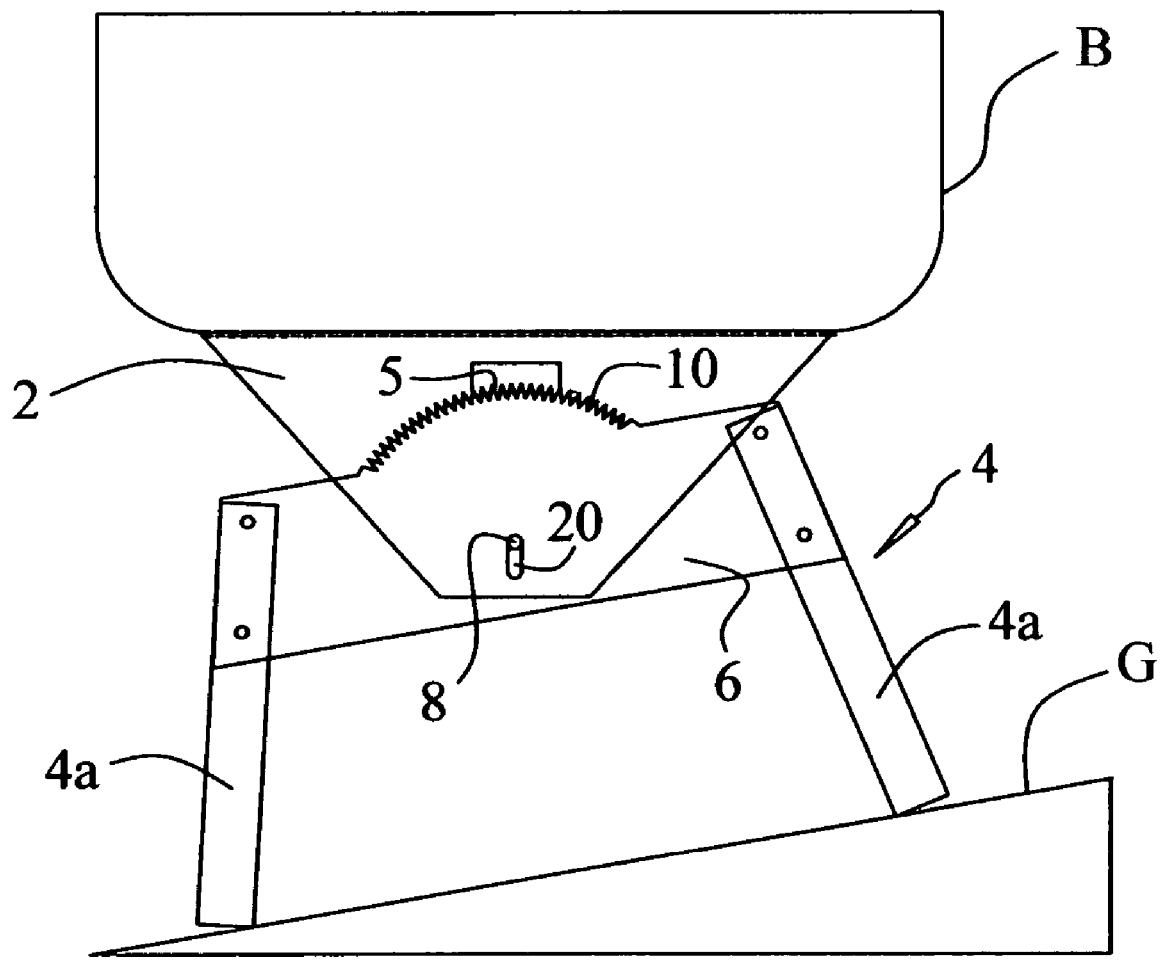
Figure 4:
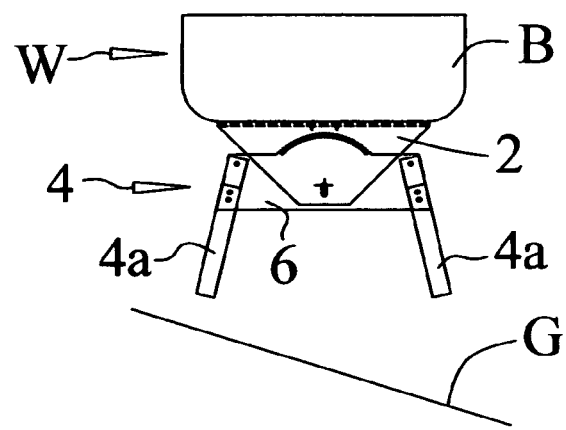
Figure 5:
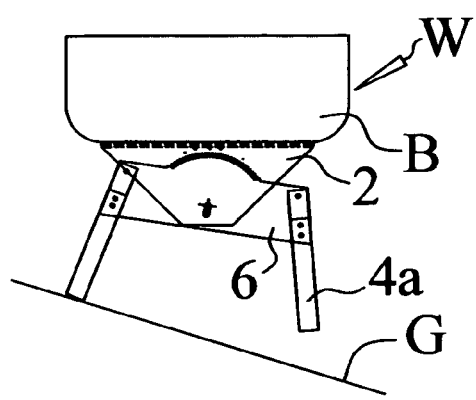
Figure 6:
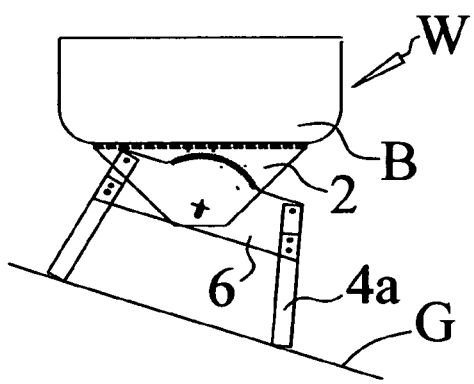
Figure 7:
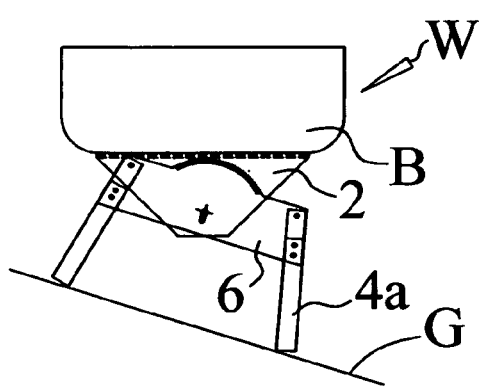
Figure 8:
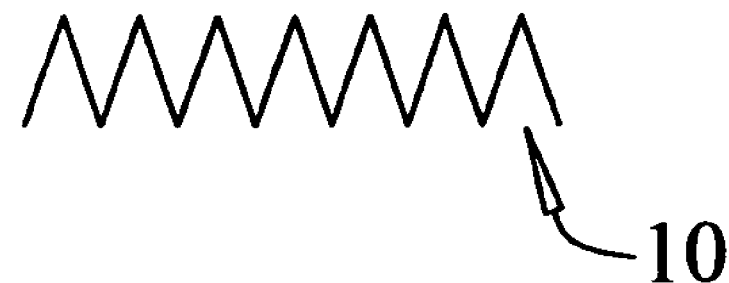
FIG. 8 illustrates exemplary locking teeth designs for the central plate of the rear leg assembly of the embodiment illustrated in FIGS. 2-7.
Figure 8:
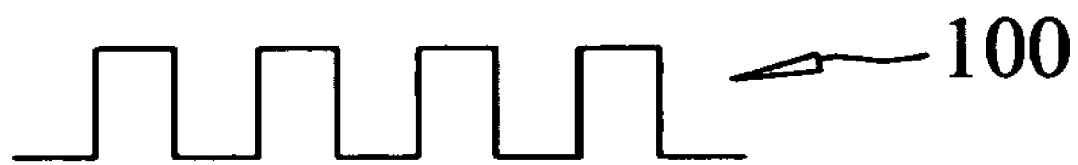
Figure 8:
Figure 8:
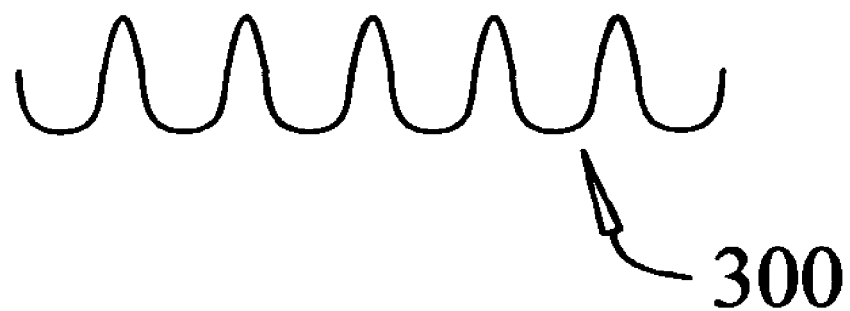

As the leg assembly 4 rotates, the gap between the two sets of teeth (or locking components) remains constant. When both legs are in contact with the ground G, the rotation of the leg assembly stops. As the wheelbarrow continues to be lowered, the leg assembly moves up in the slot 20. This engages the two sets of teeth and locks the assembly into position, as shown in FIG. 3. The number of teeth and the spacing between teeth establish a finite number of positions which can be achieved. FIG. 8 illustrates various tooth designs 10, 100, 200, 300 that may be employed. A practical design must consider the resolution desired between positions, the loads to be carried, and the physical properties of the materials in order to establish an appropriate tooth size and spacing. When the handle assembly H (not shown in FIGS. 2-7 for ease of illustration) is lifted and the legs lose ground contact, the weight of the leg assembly causes it to move down in the slot and disengage the teeth. The leg assembly then rotates back to a free-hanging position. This embodiment and its operation are illustrated in FIGS. 4-7.

Figure 9:
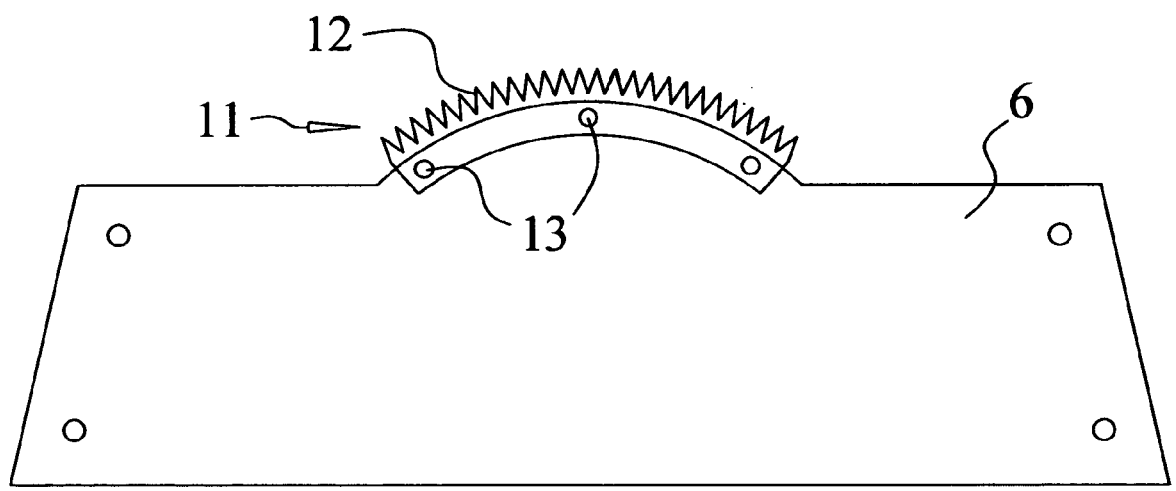
FIG. 9 illustrates a replacement plate comprising one of the locking teeth designs of FIG. 8, the replacement plate designed to be secured to the central plate of the rear leg assembly.

Improvements to the design illustrated in FIGS. 2-7 include the provision of a separate replacement plate 11 comprising a series of locking teeth 12, as illustrated in FIG. 9. This feature is desireable when the original locking teeth of the leg plate 6 begin to wear down over time, thereby failing to lock the leg assembly in place when the wheelbarrow is parked. In one embodiment, the replacement plate 11 may be secured to the leg assembly plate by any conventional means, including screws, clamps, clips, bolts, and the like. FIG. 9 illustrates one embodiment of the replacement locking plate comprising holes 13 through which a screw (not shown), for example, may be engaged. It is recommended, however, that the teeth of the leg plate 6, regardless of configuration (i.e. 10, 12, 100, 200, 300) be formed of a harder material than the teeth 5 on the rear mounting bracket to prevent premature wear.

Figure 10:
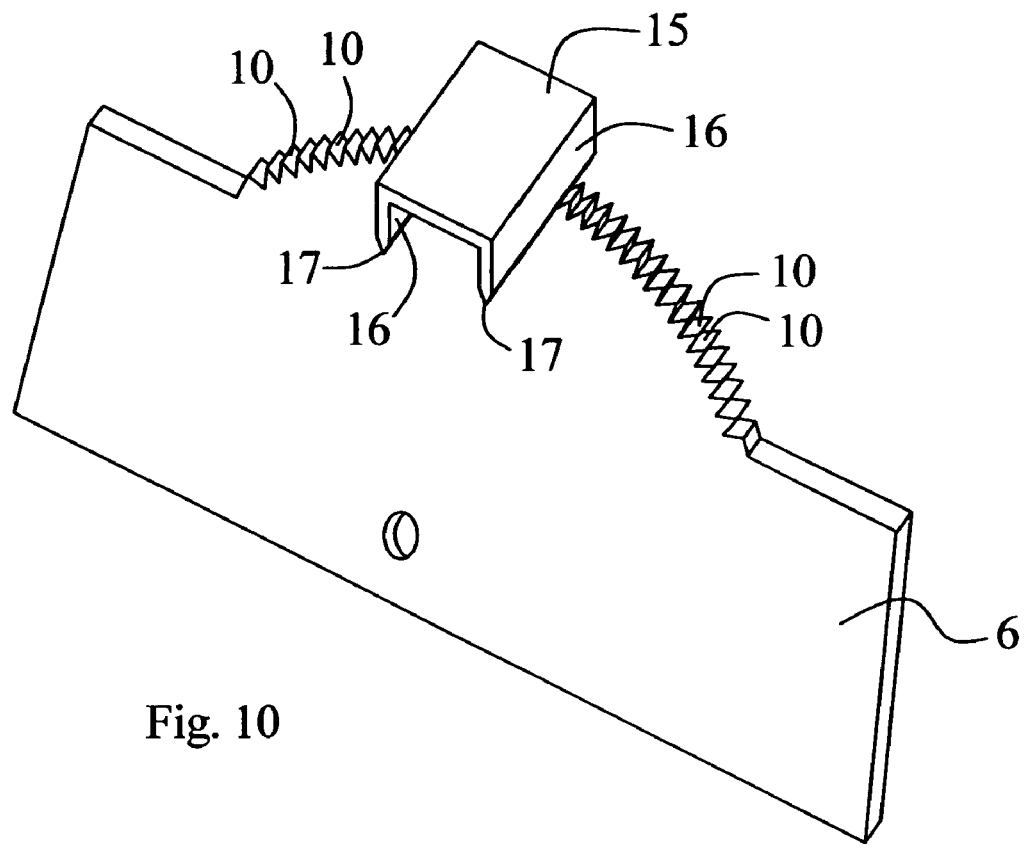
FIG. 10 illustrates one design of the locking component secured to the rear mounting bracket of the wheelbarrow, the locking component designed to engage the locking teeth of the leg assembly plate.
Figure 11:
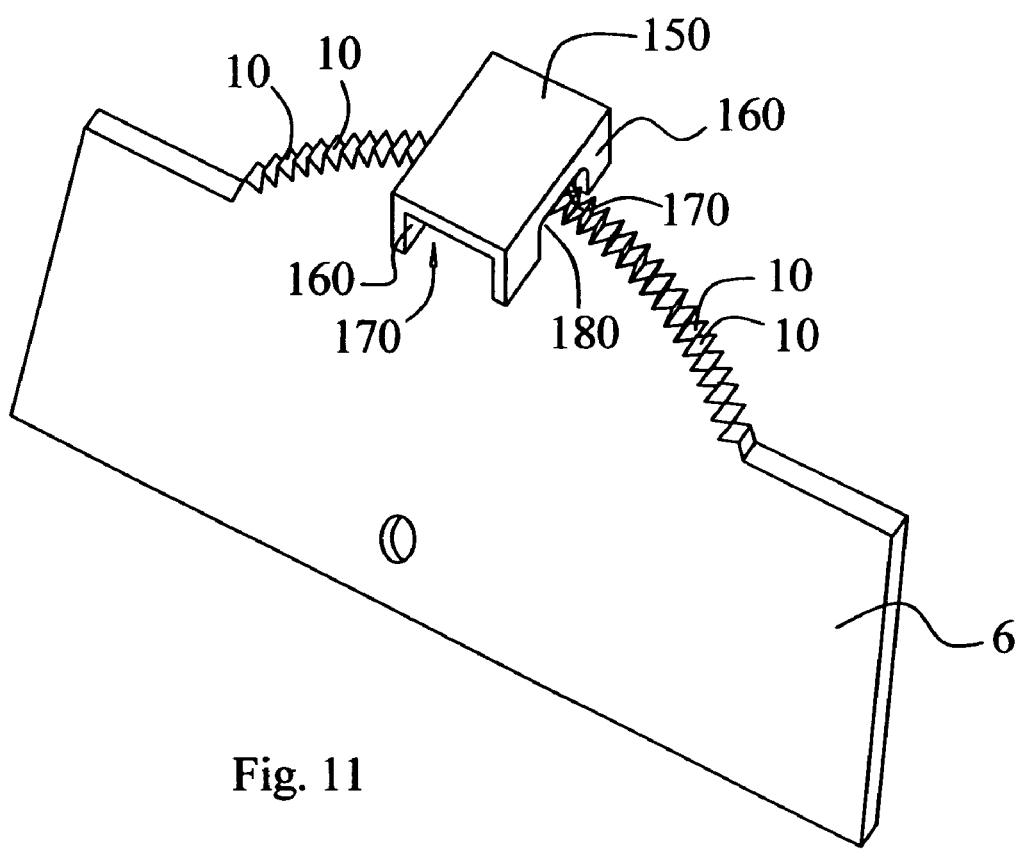
FIG. 11 is second embodiment of the locking component secured to the rear mounting bracket of the wheelbarrow for engagement of the locking teeth of the leg plate assembly.

FIG. 11 illustrates an improvement to the design illustrated in FIG. 10. Here, the separate locking component that is secured to the rear mounting bracket 2 is very similar to that illustrated in FIG. 10 in that it is essentially a C-channel member 150 having adjacent side walls 160. The embodiment illustrated in FIG. 11, however, differs in that each side wall further includes a notch 180. Each notch 180 has an upper edge 170 that is tapered to engage the teeth 10 of the leg assembly plate 6, similar to the edges 17 of the locking component illustrated in FIG. 12. The provision of the notches 180 prevents front-to-back movement of the locking teeth 10, once engaged therein.

Figure 12:
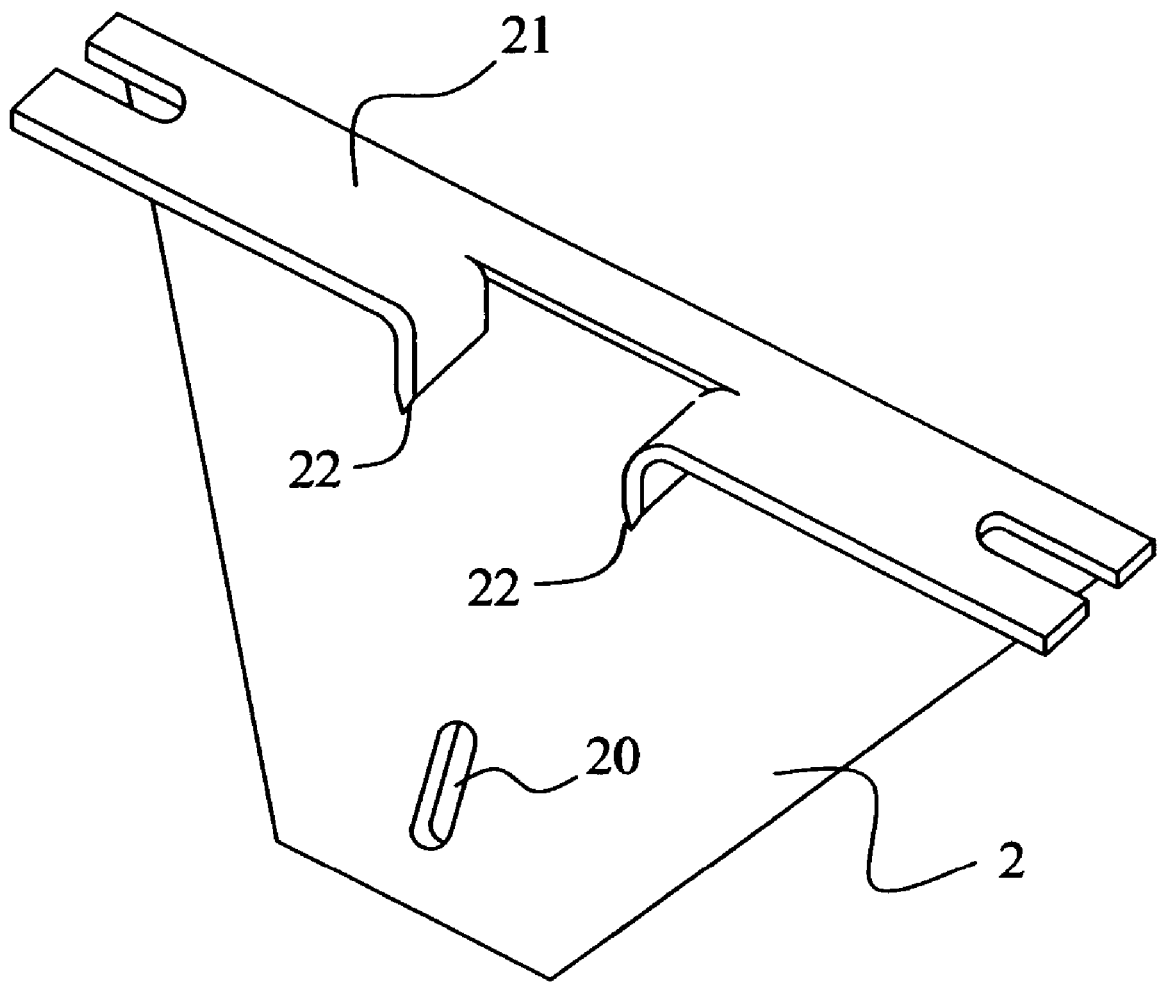
FIG. 12 is a third embodiment of the locking component secured to the rear mounting bracket of the wheelbarrow for engagement of the locking teeth of the leg plate assembly.

FIG. 12 illustrates another embodiment of the locking component of the rear mounting bracket 2, wherein the upper edge 21 comprises two teeth 22 having edges ground down to engage the teeth 10 of the leg plate 6.

Figure 13:
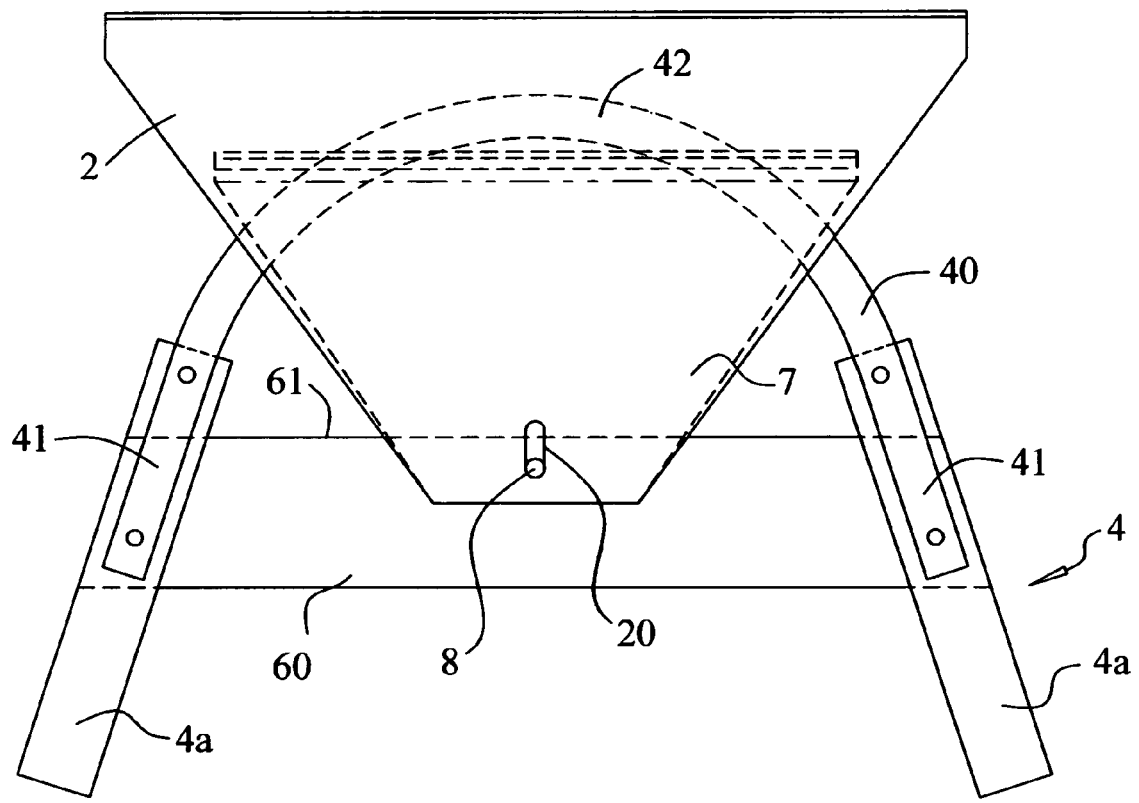
FIG. 13 is a rear view of another embodiment of the inventive wheelbarrow, showing an inverted U-shaped locking member for engagement with a second locking component secured beneath the basin of the wheelbarrow.
Figure 14:
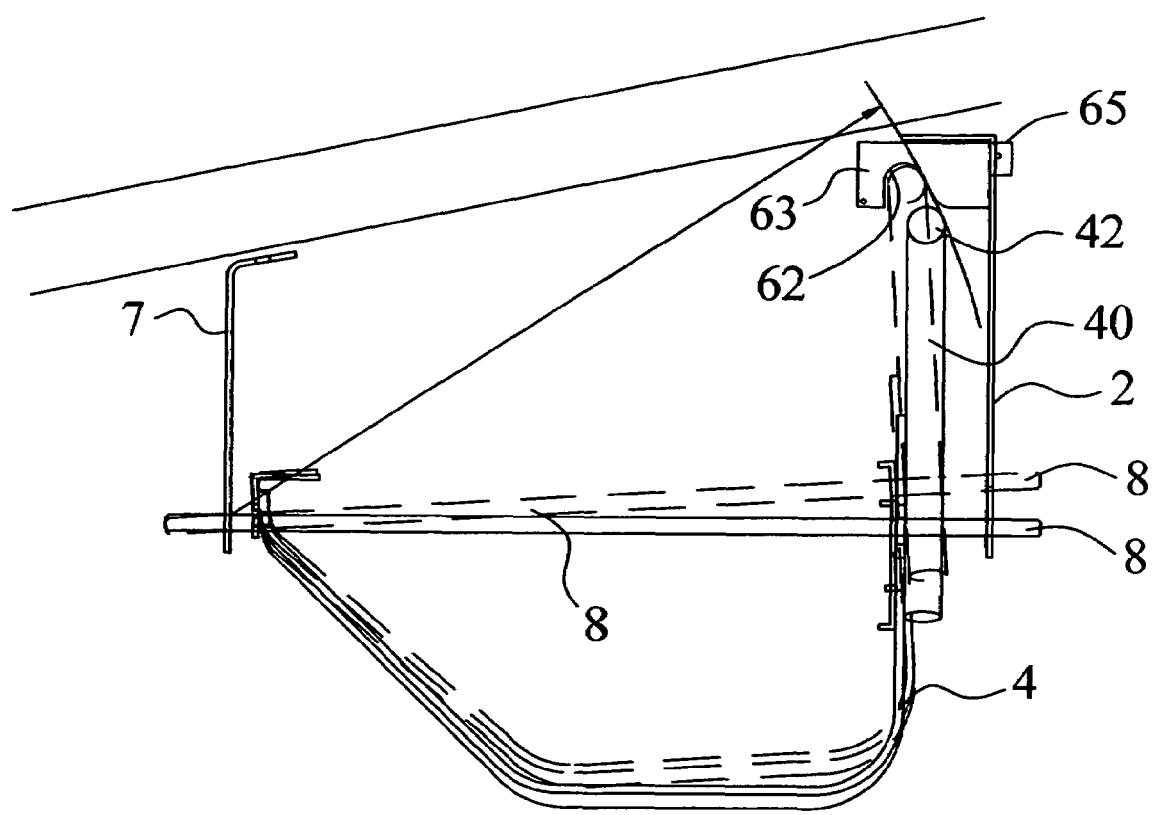
FIG. 14 is a side view of the embodiment shown in FIG. 13 showing one embodiment of the second locking component.
Figure 15:
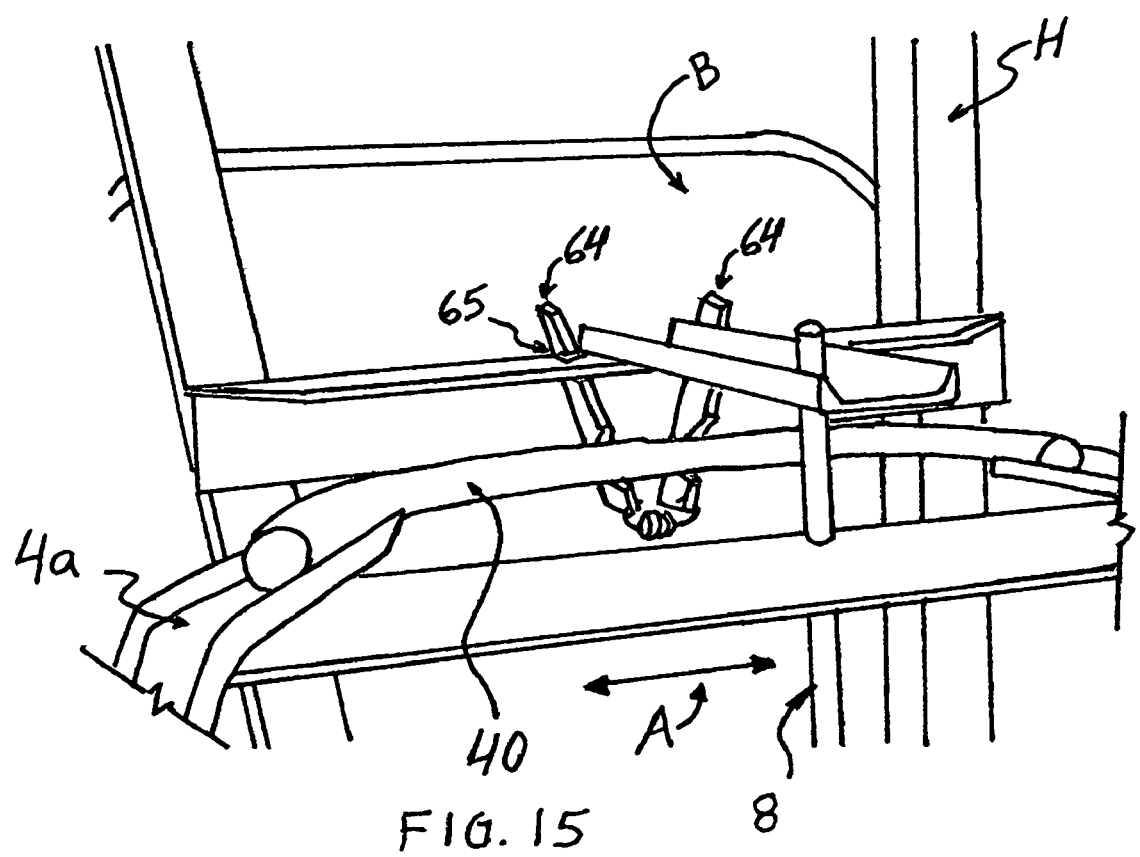
FIG. 15 is a bottom view of a wheelbarrow of FIG. 13, illustrating a second embodiment of the second locking component.
Figure 16:
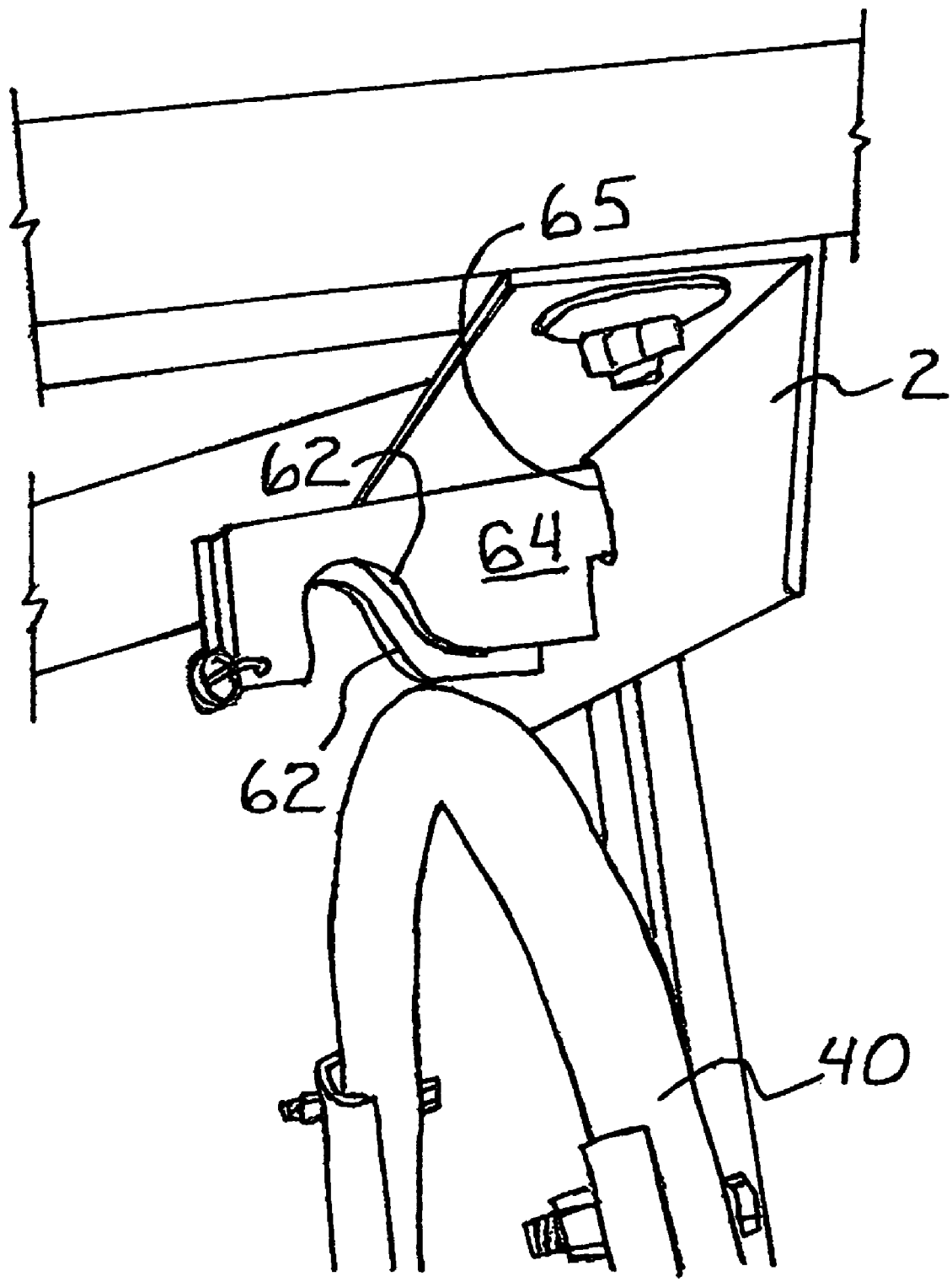
FIG. 16 is an enlarged view of the wheelbarrow shown in FIG. 15.
Figure 17:
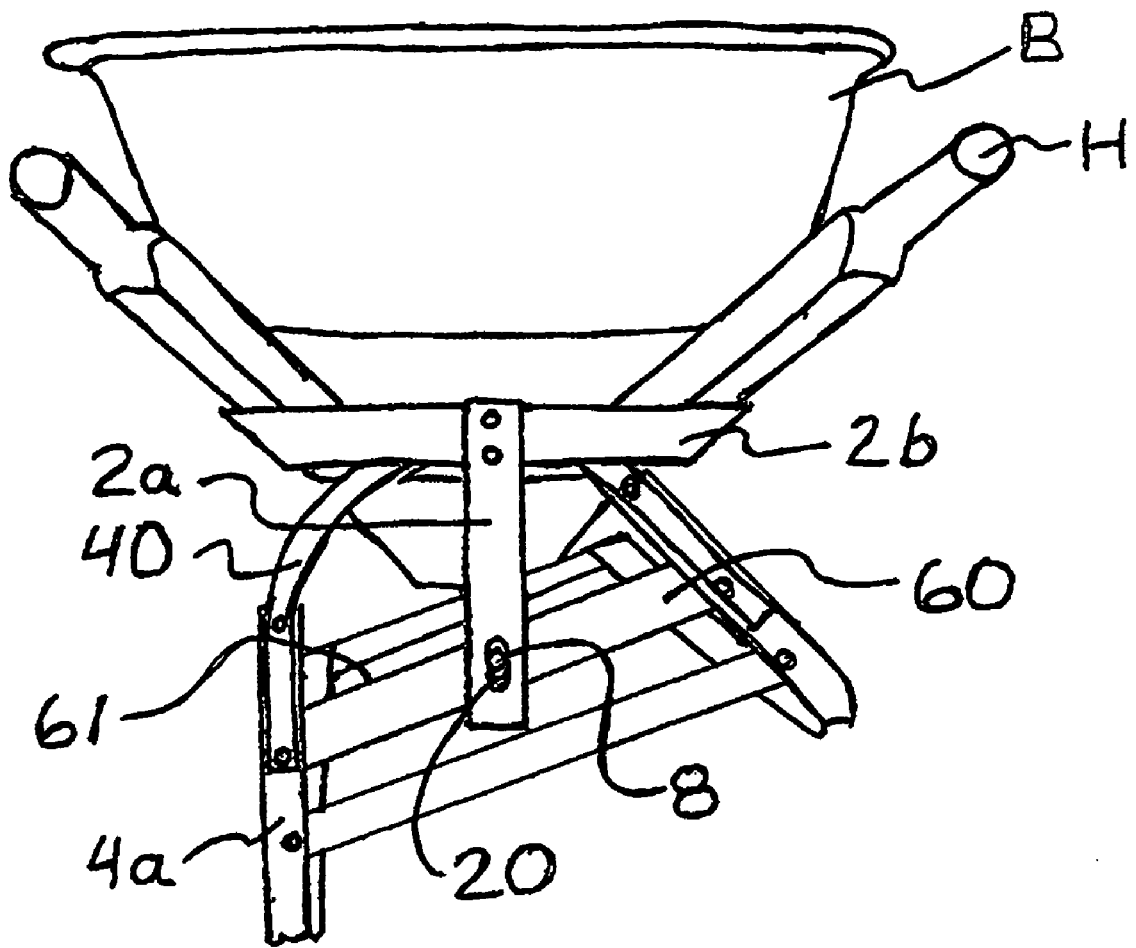
FIG. 17 is a rear view an embodiment similar to that shown in FIG. 13, wherein the rear mounting bracket is T-shaped.

FIGS. 13-22 illustrate another improvement to the design illustrated in FIGS. 2-7 as well as those embodiments illustrated and described in co-pending U.S. Ser. No. 10/769,989. FIG. 13 is schematic rear view of this embodiment wherein the leg assembly 4 is secured to an inverted U-shaped locking member 40. Each end 41 of the locking member is secured to a corresponding rear leg 4a of the leg assembly 4, each of the legs also secured to a leg assembly plate 60 similar to the leg plate 6 illustrated in FIGS. 2-7. Like the leg assembly plate 6 as illustrated in FIGS. 2-7, a pin 8 extends therefrom for engagement within a slot 20 of the rear mounting bracket 2 (note that the rear mounting bracket shown in FIG. 17 is modified to include a top horizontal segment 2b and a lower vertical segment 2a, arranged in a T-formation). Alternatively, as discussed above, the pin 8 may extend from the rear mounting bracket 2 for engagement within a vertical slot provided in the leg assembly plate 60 (not shown).

The leg plate 60 in this second embodiment, however, differs from that shown in FIGS. 2-7 in that the top edge 61 of the leg plate 60 is not configured to engage the locking component of the rear mounting bracket 2, for example. Instead, the central portion 42 of the U-shaped locking member 40 is configured to engage a slot 62 provided in the locking component of the rear mounting bracket 2. As better shown in FIGS. 13-14, this locking component may be a locking bar 63 comprising a slot or channel 62 that must be sufficiently large to allow clearance for the central portion 42 of the locking member (to move up and down, yet be sufficiently narrow to lock when in a fully seated position (i.e. when the wheelbarrow is parked). The locking bar 63 is pivotally secured (relatively loosely) to the rear mounting bracket 2 through a slot 65 provided in the rear mounting bracket 2. The locking component may be single locking bar or consist of two adjacent bars or plates 64, each with a notch 66 in registration within one another to form the slot or channel for engagement of the locking member 40 therein, as best illustrated in the photographs of FIGS. 15-16. [As used herein in the present description and claims, the terms "bar" and "plate" are synonymous] The end of each plate 64 is engaged within a corresponding slot 65 provided in the rear mounting bracket, as described above, such that the plates 64 may move slightly left or right (in the direction of arrows A in FIG. 15) as the curved locking member 40 moves clockwise or counterclockwise, thereby acting as a self-locking friction brake. The more the leg assembly 4 rotates in either direction, the greater the locking force. FIG. 17 is a rear view the embodiments shown in FIGS. 15-16.

Figure 18:
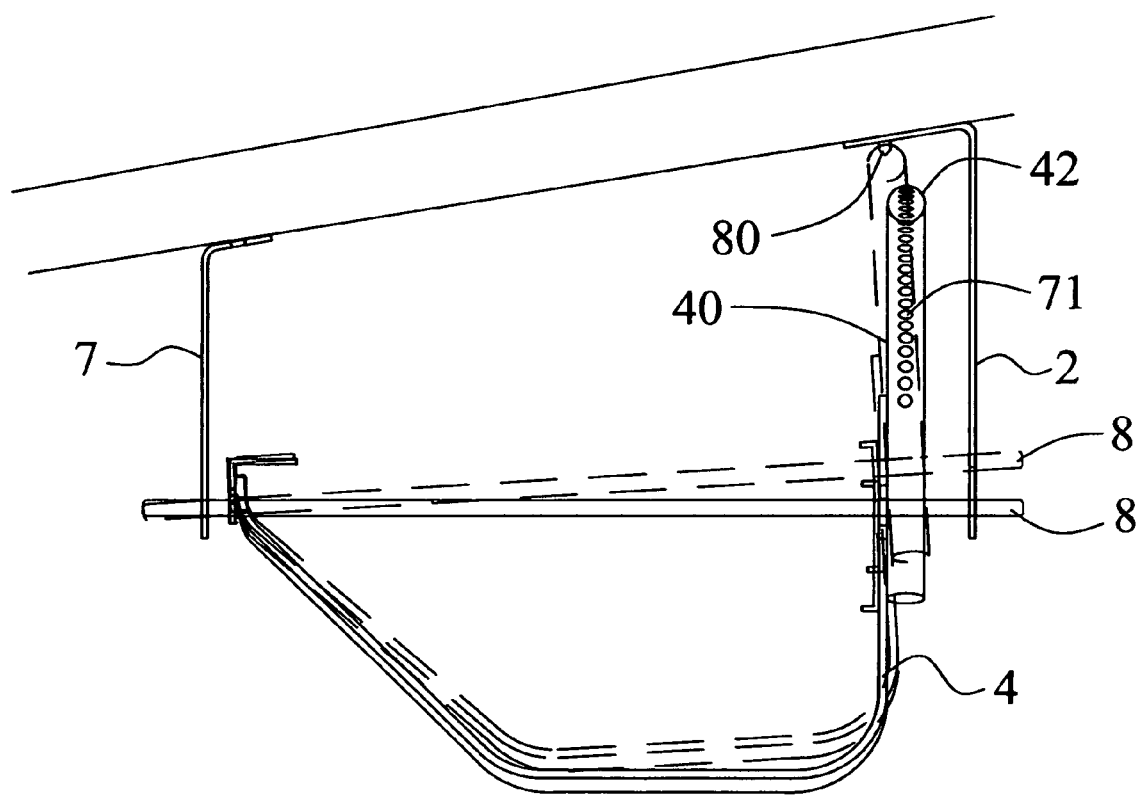
FIG. 18 is a side view of third embodiment of the wheelbarrow shown in FIG. 13, wherein the U-shaped locking member comprises a series of holes, and the second locking component is a pin designed for engagement within one of the holes of the U-shaped locking member.
Figure 19:
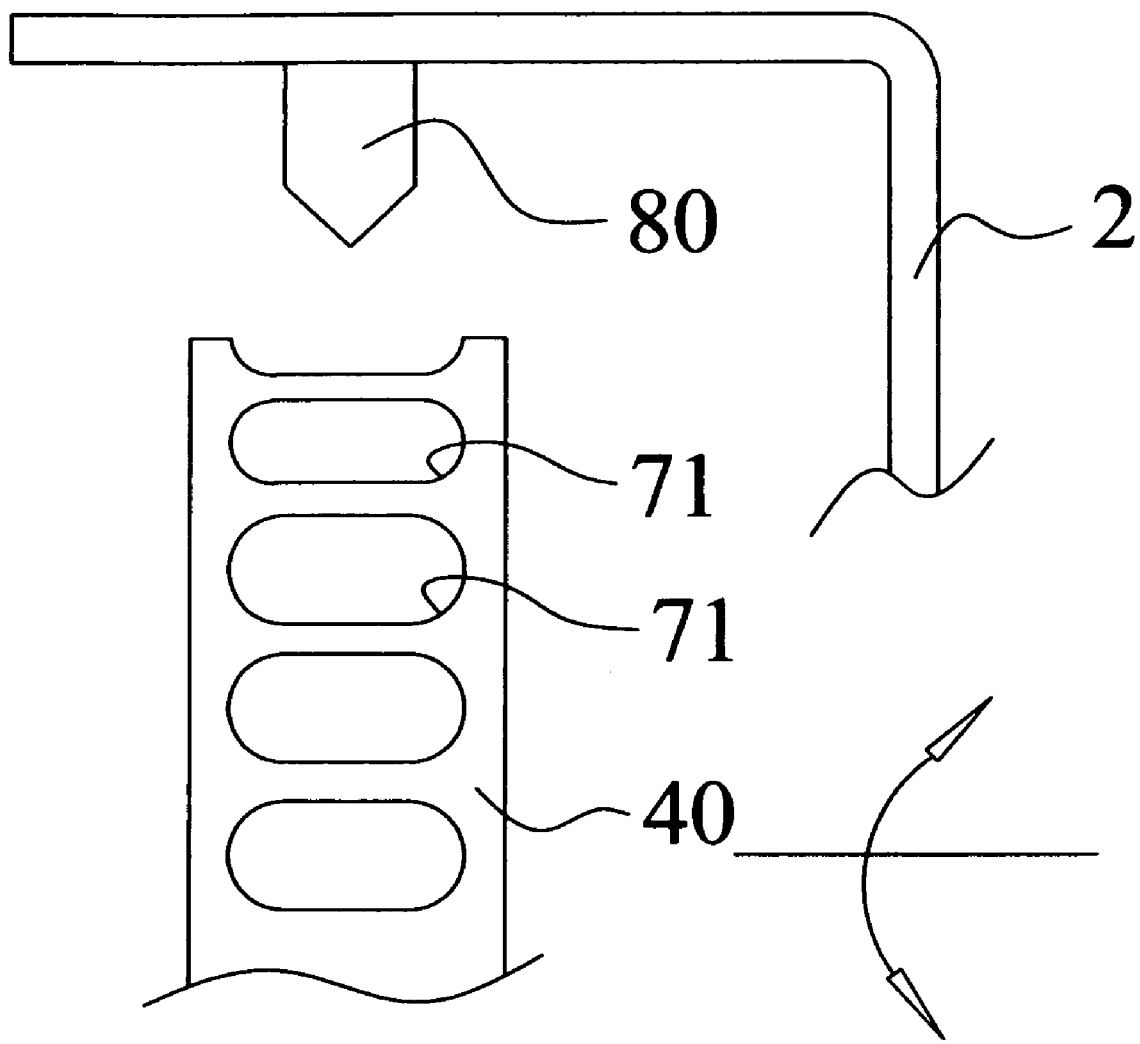
FIG. 19 is an enlarged view of the locking mechanism shown in FIG. 18.

FIGS. 18-20 illustrate an alternate design to that shown in FIGS. 13-17. As discussed above, the inverted U-shaped locking member 40 is maintained within the locking bar 63 or plates 64 via friction only. In the embodiments illustrated in FIGS. 18-20, however, the U-shaped locking member 40 is provided with a series of holes 71 through which a locking pin 80, extending downward from the locking component, may be engaged when the wheelbarrow is parked. FIG. 18 is a side view of this embodiment, and FIG. 19 is an enlarged view of this locking feature. Thus, instead of providing a pair of locking plates 64 (or single locking bar 63), each forming an arcuate slot for engaging the complementarily curved portion 42 of the locking member 40 for friction engagement therein, this second embodiment comprises a simple pin 80 that extends downward from the wheelbarrow basin B, or as shown in FIGS. 18-19, a portion of the rear mounting bracket 2 secured to the bottom of the basin B. As the leg assembly 4 of the wheelbarrow rotates, the locking member 40 also rotates freely beneath the pin 80. When the wheelbarrow is parked, the central portion 42 of the locking member 40 moves upward to engage the pin 80.

Figure 20A:
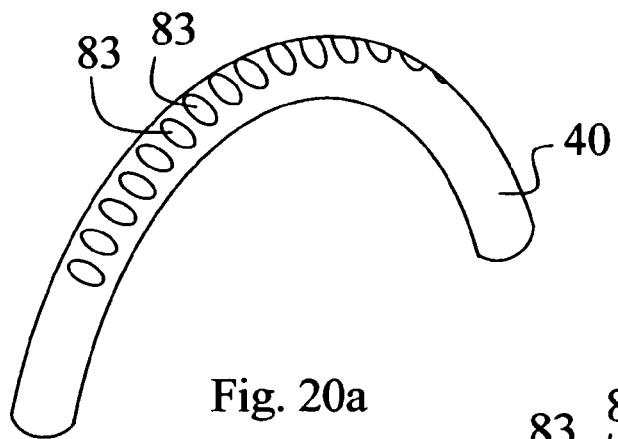
FIGS. 20a-20d are modifications of the U-shaped locking member shown in FIG. 18.
Figure 20B:
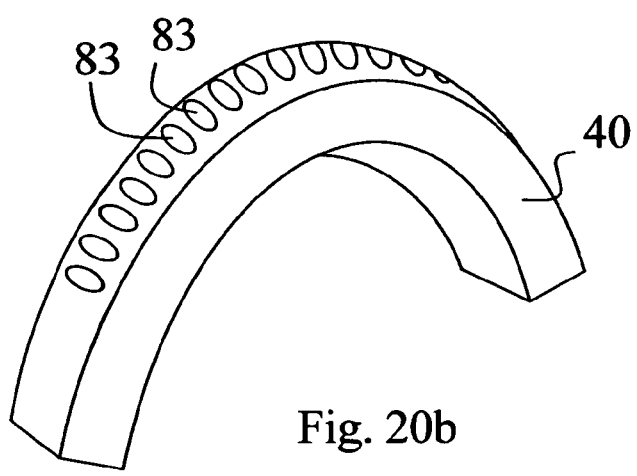
Figure 20C:
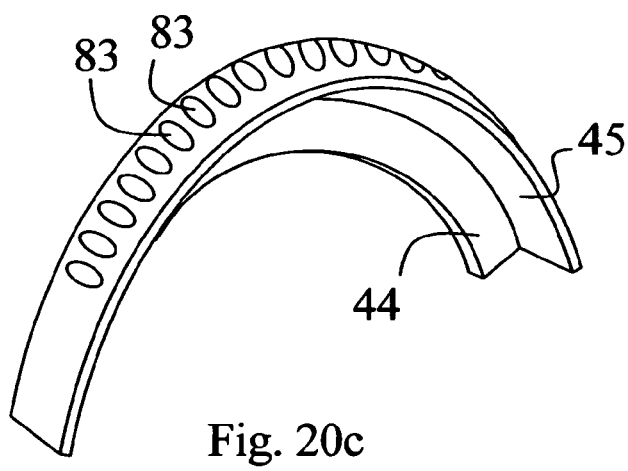
Figure 20D:
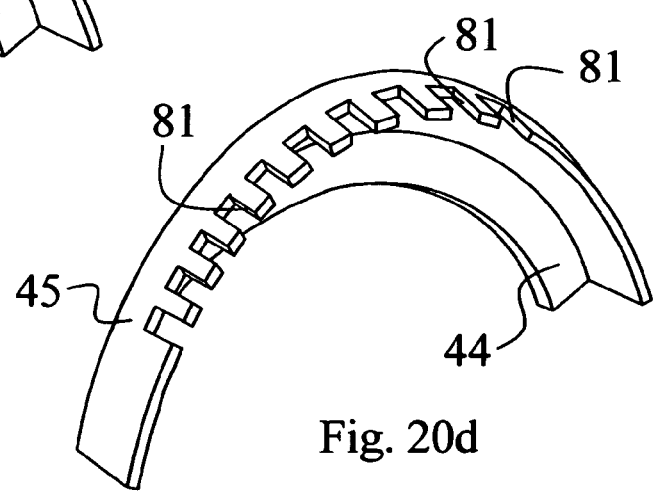

It will be appreciated by the skill artisan that the size, spacing, and configuration of the holes 71 provided in the locking member 40 may be modified. In addition, the angle of the arc and the configuration of the locking member may be modified if desired. FIGS. 20a-20b each show locking members 40 having a tubular shape, although FIG. 20a is a rounded tube while FIG. 20b is square. FIGS. 20c-20d illustrate the use of a somewhat L-shaped angle member having a side wall 44 and a top wall 45. In FIGS. 20a-20c, the locking members all comprise centrally positioned holes 83; while FIG. 20d illustrates a series of notches 81 that penetrate the outer edge and extend toward the center of the top wall of the angle member.

Figure 21:
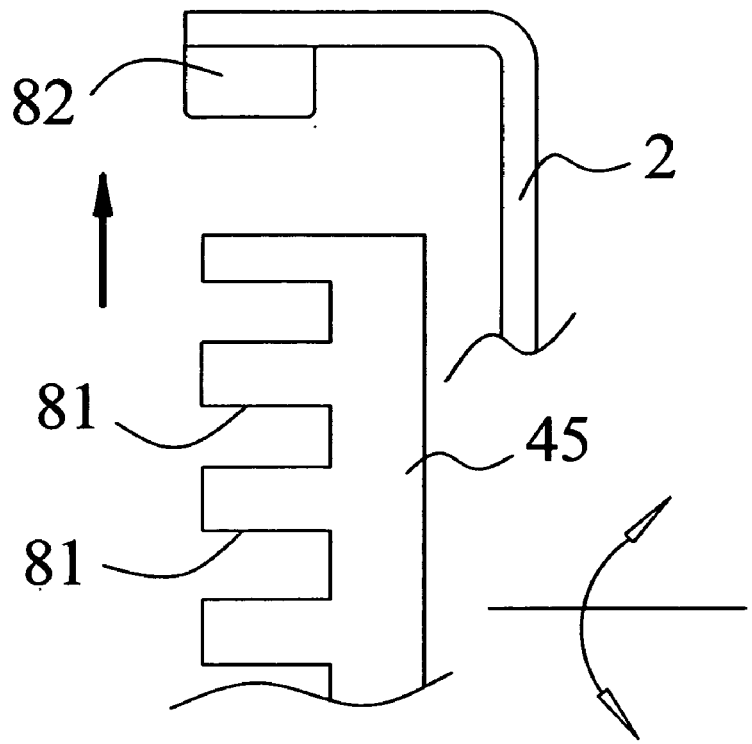
FIG. 21 is an enlarged side view of a fourth embodiment of the wheelbarrow shown in FIG. 13, wherein the U-shaped locking member comprises a series of notches as shown in FIG. 20d, and the second locking component is a rectangular tab.
Figure 22:
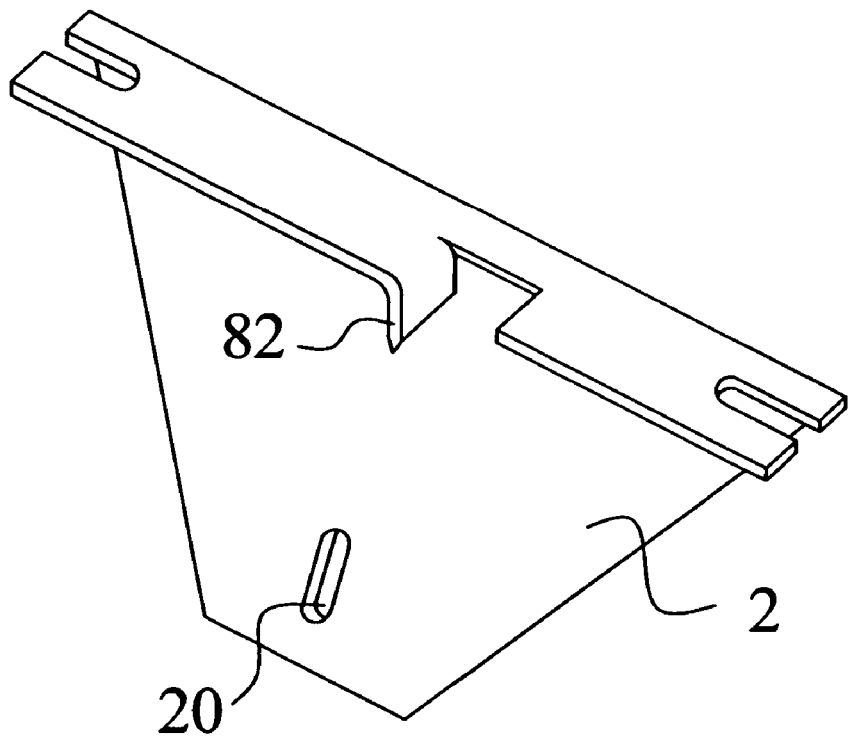
FIG. 22 is a modification of the second locking component shown in FIG. 21.

FIGS. 21-22 illustrate the design of the locking feature of the rear mounting bracket 2 when the locking member of FIG. 20d is employed (i.e. angle member). Here, instead of employing a pin, as shown in FIGS. 18-19, a substantially rectangular tab 82 is employed that extends downward from the rear mounting bracket 2, as shown, similar to the locking pin 80 embodiments shown in FIG. 18-19. Preferably, the tab 82 is sufficiently small (i.e width and length) to easily engage the corresponding notches to thereby lock the wheelbarrow leg. However, the tab 82 should be large enough such that engagement is relatively tight to minimize minor rotation of the legs while the wheelbarrow is parked. It should be further noted that the tab 82 may be cylindrical, like pin 80 or of another configuration, to engage complementary-shaped notches of the locking member.

The figures illustrate locking components 15, 150, 63, 64 as being secured to the rear mounting bracket 2; however, it will be readily appreciated by those of ordinary skill in the art that these locking components could, instead, be secured directly to the bottom of the wheelbarrow basin B or to another structure that in turn is secured to the bottom of the basin B (not shown). Likewise, the second locking component 80, 82 illustrated in FIGS. 18-19 and 21 may also be secured directly to the basin B or to a separate component secured to the basin (not shown).

Figure 23A:
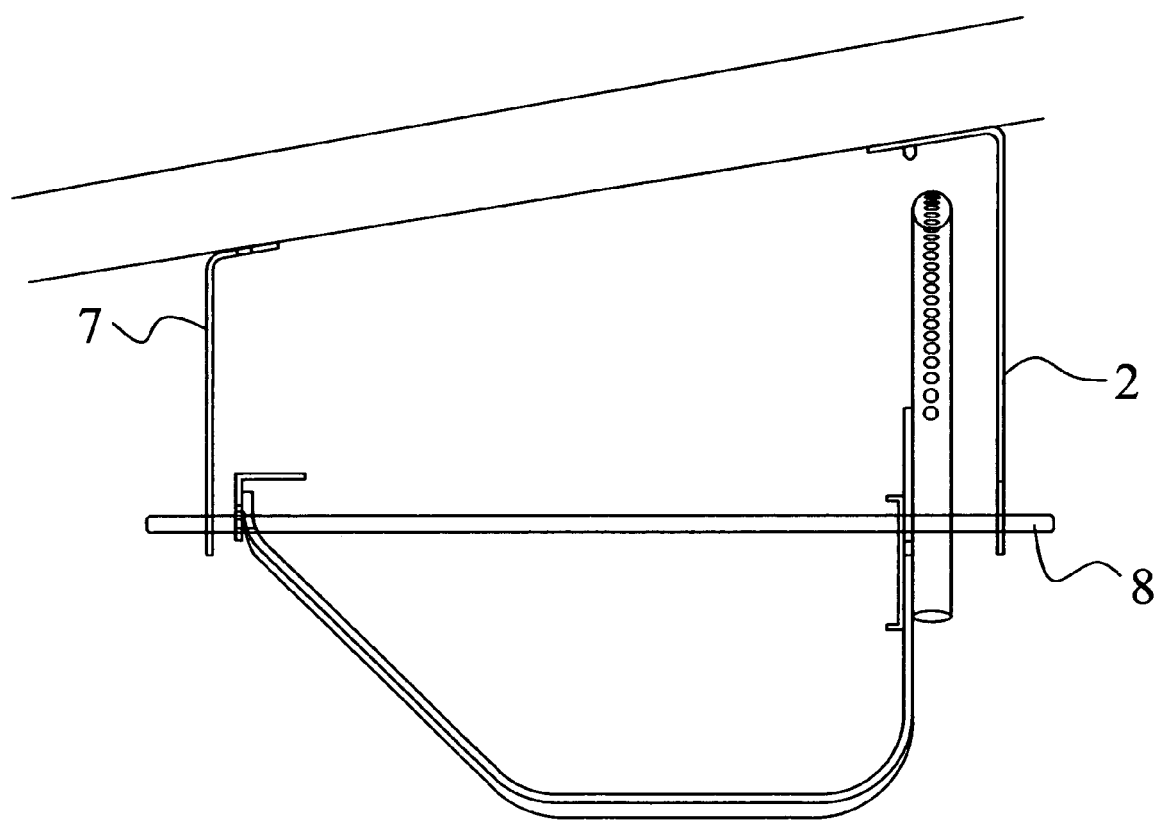
FIG. 23 is a side view of the embodiment shown in FIG. 13.
Figure 23B:
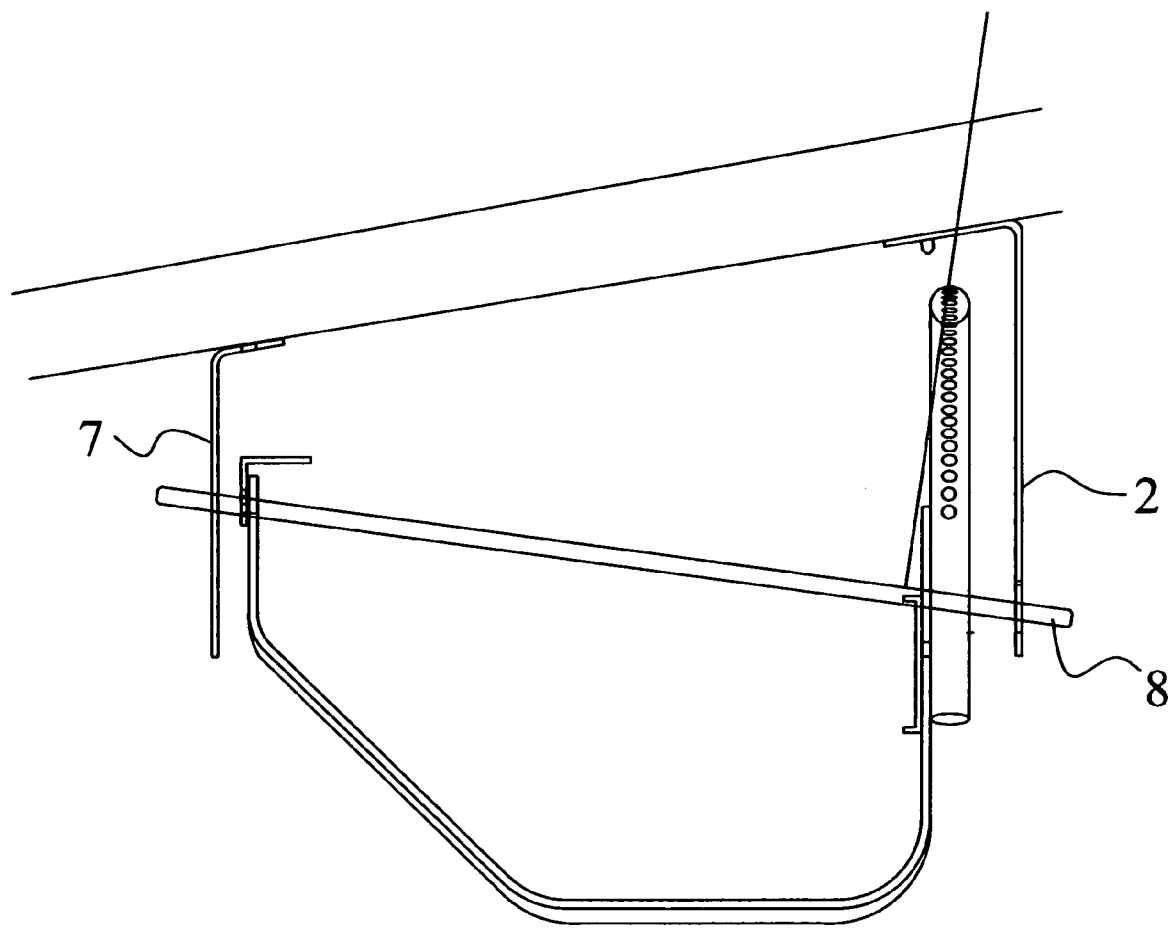

It is important to note that the front and rear pivot points provided in the front 7 and rear mounting brackets 2, respectively, must lie on a line that is substantially perpendicular to the plane of the curved member. Such orientation ensures that the U-shaped locking member 40 (or angle member (FIG. 20d)) will rotate in a plane, and that regardless of the degree of rotation, the holes 71,83 (or notches 81) will always line up with the pin 80 (or tab) or locking bar 63 (or plates 65) (see FIG. 23A). If the axis of rotation is not perpendicular to the plane of the curved member, the holes or notches will be increasingly misaligned with the pin (or tab) with increasing rotation of the legs. as shown in FIG. 23B.

Figure 24:
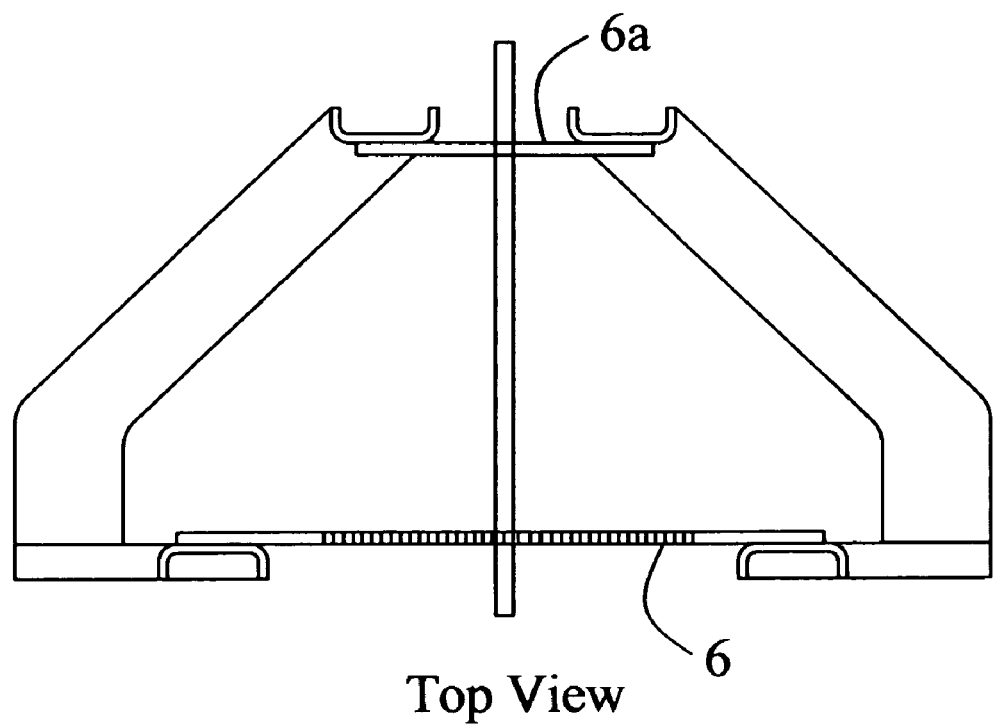
FIG. 24 illustrates top and rear views of the leg assembly in combination with the rear leg brace and front leg brace, wherein the front leg brace is smaller in size than the rear leg brace.
Figure 24:
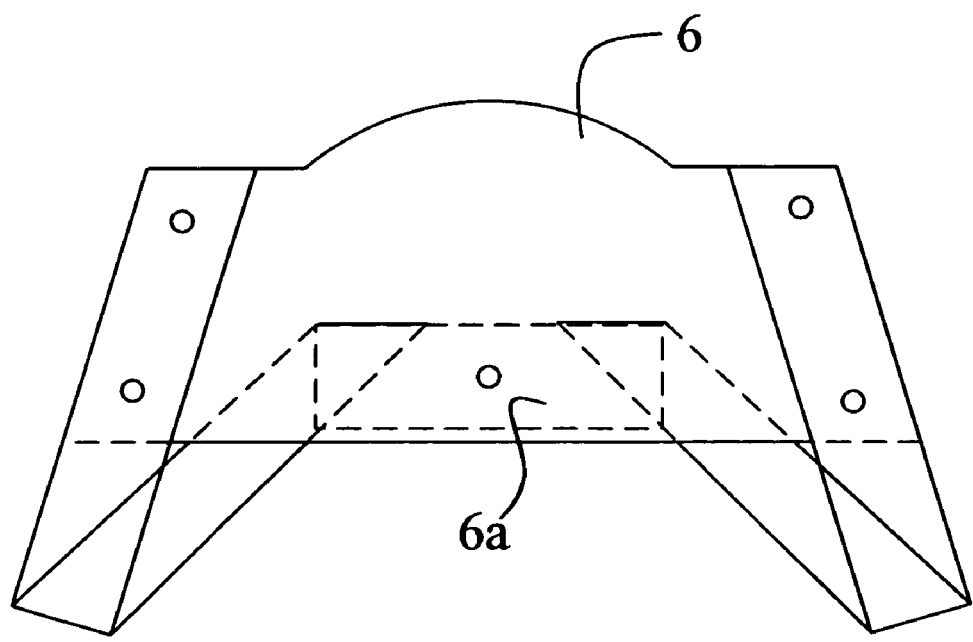
Figure 25:
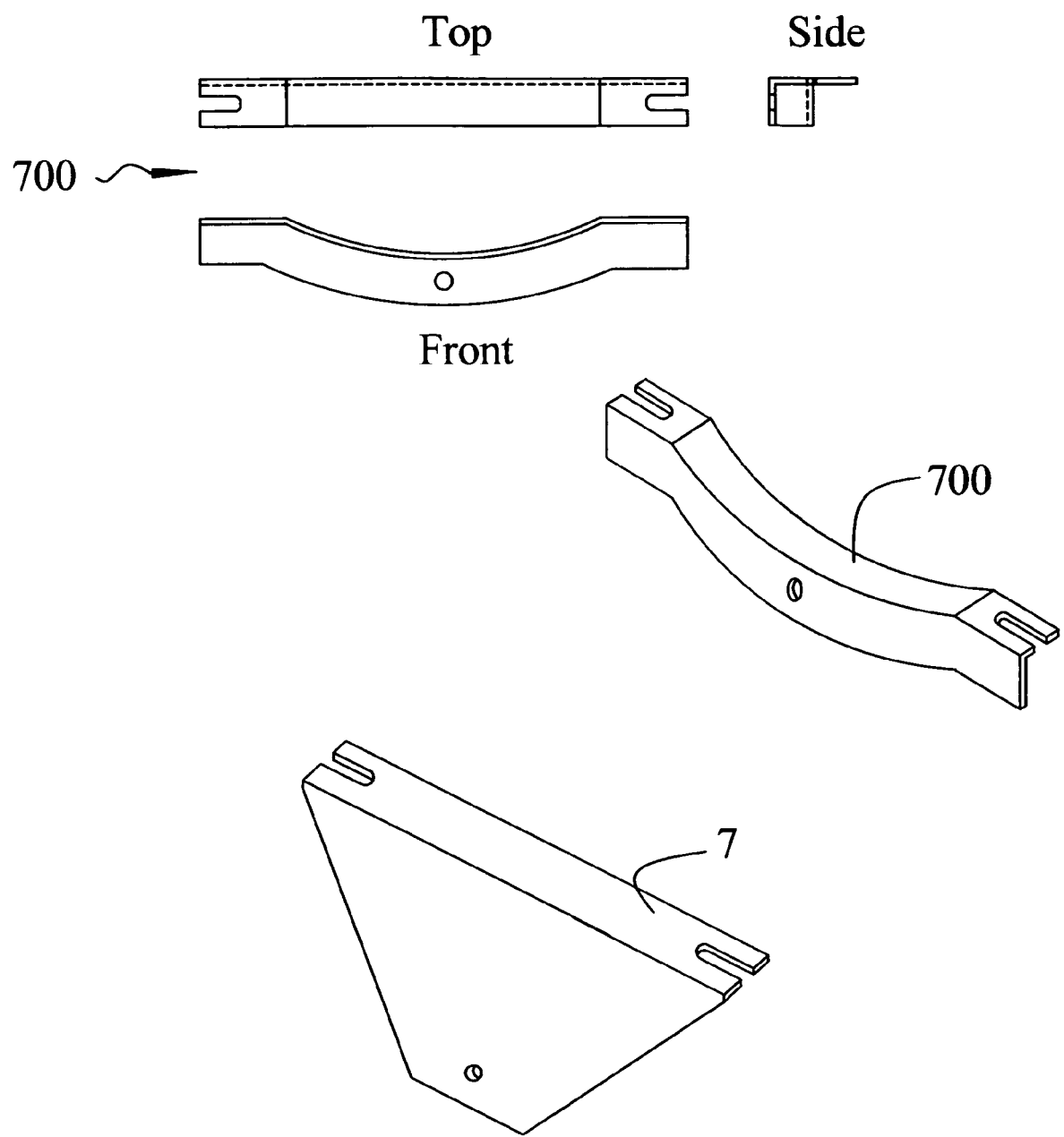
FIG. 25 illustrates exemplary front mounting bracket designs.
Figure 26:
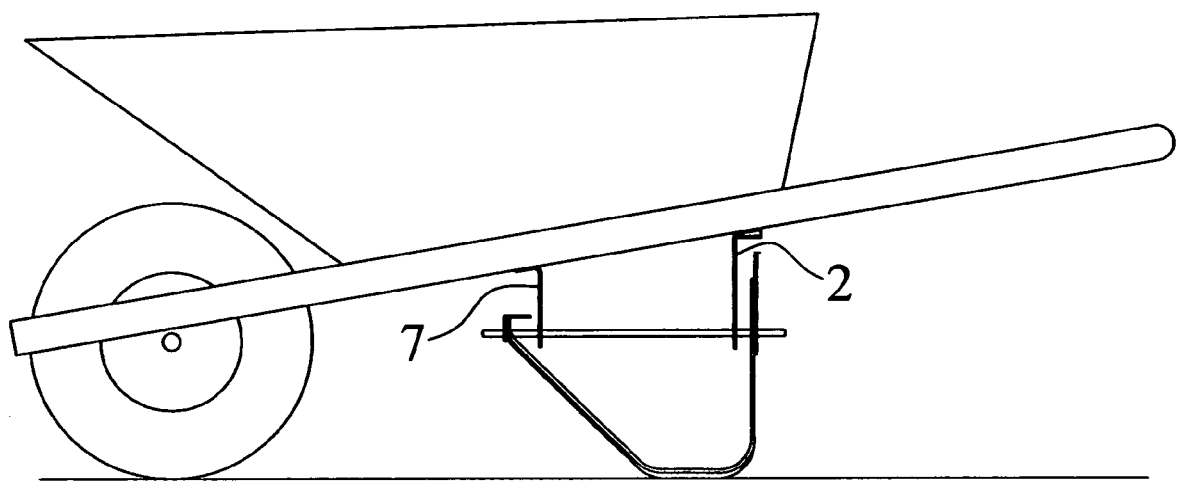
FIG. 26 illustrates the front mounting bracket and the rear mounting bracket oriented between the front and rear legs of the leg assembly, as opposed to being positioned outside of the legs.

Other modifications of the inventive wheelbarrow design are also illustrated FIGS. 24-26. FIG. 24 includes top and rear views of the leg assembly in combination with the rear leg brace 6a and front leg brace 7. In FIG. 24, the front leg brace 7 is smaller in size than the rear leg brace 2.

FIG. 25 illustrates exemplary front mounting bracket designs 7, 700.

Finally, FIG. 26 illustrates the front mounting bracket 7 and the rear mounting bracket 2 oriented between the front and rear legs of the leg assembly, as opposed to being positioned outside of the leg assembly.

The invention claimed is:

1. A self-leveling wheelbarrow comprising:
   a. a basin having a front end, a rear end, a left side and a right side;
   b. a wheel disposed beneath said basin near said front end;
   c. a handle assembly secured to said basin;
   d. a rear mounting bracket secured near said rear end of said basin, said mounting bracket having a top end secured beneath said basin;
   e. a leg assembly, said leg assembly comprising a pair of legs secured to one another by a centrally disposed plate, such that one of said pair of legs is positioned beneath said right side of said basin and the other one of said pair of legs is positioned beneath said left side of said basin, said plate further having a centrally disposed, arcuate top edge and a set of teeth arranged along said top edge;
   f. a means for movably securing said leg assembly plate to said rear mounting bracket, such that said leg assembly may rotate in a counterclockwise or clockwise direction and in a vertical direction relative to said rear mounting bracket; and
   g. a locking component secured beneath said basin and positioned above said top edge of said leg assembly plate, wherein said locking component is a C-channel member having a pair of adjacent side walls extending downward, each of said side walls further having a tapered edge;

whereby as said leg assembly contacts the underlying ground as the wheelbarrow is parked, said leg assembly rotates about said rear mounting bracket to accommodate the contour angle of the ground, sliding said top edge of said plate within said locking component to thereby engage said tapered edges of said locking component within adjacent teeth of said top edge of said leg assembly plate, thereby locking said plate therein to prevent said leg assembly from rotating further, either in a clockwise direction of travel or a counterclockwise direction of travel.

2. The wheelbarrow of claim 1, wherein each of said side walls of said locking component comprises a notch, each of said notches further including said tapered edge for engagement between adjacent teeth of said top edge of said leg assembly plate when said locking component is so engaged with said top edge of said leg assembly plate.

3. The wheelbarrow of claim 1, wherein said means for movably securing said leg assembly plate to said rear mounting bracket comprises a vertical slot communicating through said rear mounting bracket and a pin extending from said leg assembly plate, said pin slidably engaged within said vertical slot to allow said leg assembly to move vertically within said slot and to rotate in said clockwise and counterclockwise direction about said pin.

4. The wheelbarrow of claim 3, wherein each of said side walls of said locking component comprises a notch, each of said notches further including said tapered edge for engagement between adjacent teeth of said top edge of said leg assembly plate when said locking component is so engaged with said top edge of said leg assembly plate.

5. The wheelbarrow of claim 1, wherein said means for movably securing said leg assembly plate to said rear mounting bracket comprises a vertical slot communicating through said leg assembly plate and a pin extending from said rear mounting bracket, said pin slidably engaged within said vertical slot to allow said leg assembly to move vertically and to rotate in said clockwise and counterclockwise direction about said pin.

6. The wheelbarrow of claim 5, wherein each of said side walls of said locking component comprises a notch, each of said notches further including said tapered edge for engagement between adjacent teeth of said top edge of said leg assembly plate when said locking component is so engaged with said top edge of said leg assembly plate.

7. The wheelbarrow of claim 1, wherein said locking component is secured to said rear mounting bracket.

8. A self-leveling wheelbarrow comprising:
 a. a basin having a front end, a rear end, a left side and a right side;
 b. a wheel disposed beneath said basin near said front end;
 c. a handle assembly secured to said basin;
 d. a rear mounting bracket secured near said rear end of said basin, said mounting bracket having a top end secured beneath said basin;
 e. a leg assembly, said leg assembly comprising a pair of rear legs secured to one another by a centrally disposed plate, such that one of said pair of legs is positioned beneath said right side of said basin and the other one of said pair of legs is positioned beneath said left side of said basin below the rear end of said basin;
 f. a means for movably securing said leg assembly plate to said rear mounting bracket, such that said leg assembly may rotate in a counterclockwise or clockwise direction and in a vertical direction relative to said rear mounting bracket;
 g. a first locking component secured to said leg assembly, said first locking component comprising an inverted U-shaped member having two opposing ends, each of said ends secured to one of said rear legs, and a central portion disposed between said opposing ends; and
 h. a second locking component secured beneath said basin and above said central portion of said first locking member, said second locking component comprising a first bar having a slot configured to engage therein said central portion of said first locking component;
whereby as said leg assembly contacts the underlying ground as the wheelbarrow is parked, said leg assembly rotates about said rear mounting bracket to accommodate the contour angle of the ground, sliding said central portion of said first locking component within said slot of said second locking component thereby locking said central portion of said first locking component therein to prevent said leg assembly from rotating further, either in a clockwise direction of travel or a counterclockwise direction of travel.

9. The wheelbarrow of claim 8, wherein said locking component comprises a second bar adjacent said first bar, said second bar having a slot configured to engage therein said central portion of said first locking component, said slot of said second bar in registration with said slot of said first bar.

10. The wheelbarrow of claim 8, wherein said means for movably securing said leg assembly plate to said rear mounting bracket comprises a vertical slot communicating through said rear mounting bracket and a pin extending from said leg assembly plate, said pin slidably engaged within said vertical slot to allow said leg assembly to move vertically within said slot and to rotate in said clockwise and counterclockwise direction about said pin.

11. The wheelbarrow of claim 10, wherein said locking component comprises a second bar adjacent said first bar, said second bar having a slot configured to engage therein said central portion of said first locking component, said slot of said second bar in registration with said slot of said first bar.

12. The wheelbarrow of claim 8, wherein said means for movably securing said leg assembly plate to said rear mounting bracket comprises a vertical slot communicating through said leg assembly plate and a pin extending from said rear mounting bracket, said pin slidably engaged within said vertical slot to allow said leg assembly to move vertically and to rotate in said clockwise and counterclockwise direction about said pin.

13. The wheelbarrow of claim 12, wherein said locking component comprises a second bar adjacent said first bar, said second bar having a slot configured to engage therein said central portion of said first locking component, said slot of said second bar in registration with said slot of said first bar.

14. The wheelbarrow of claim 8, wherein said second locking component is secured to said rear mounting bracket.

15. A self-leveling wheelbarrow comprising:
 a. a basin having a front end, a rear end, a left side and a right side;
 b. a wheel disposed beneath said basin near said front end;
 c. a handle assembly secured to said basin;
 d. a rear mounting bracket secured near said rear end of said basin, said mounting bracket having a top end secured beneath said basin;
 e. a leg assembly, said leg assembly comprising a pair of rear legs secured to one another by a centrally disposed plate, such that one of said pair of legs is positioned beneath said right side of said basin and the other one of said pair of legs is positioned beneath said left side of said basin below the rear end of said basin;
 f. a means for movably securing said leg assembly plate to said rear mounting bracket, such that said leg assembly may rotate in a counterclockwise or clockwise direction and in a vertical direction relative to said rear mounting bracket;
 g. a first locking component secured to said leg assembly, said first locking component comprising an inverted U-shaped member having two opposing ends, each of said ends secured to one of said rear legs, and a central portion disposed between said opposing ends;
 h. said first locking component further including a series of holes penetrating through said first locking component;
 h. a second locking component secured beneath said basin above said first locking component, said second locking component comprising a locking pin configured for engagement within one of said holes of said first locking component;
whereby as said leg assembly contacts the underlying ground as the wheelbarrow is parked, said leg assembly rotates against said rear mounting bracket to accommodate the contour angle of the ground, sliding said central portion of said first locking component upwards for engagement of said locking pin within one of said holes, thereby locking said central portion of said first locking component therein to prevent said leg assembly from rotating, either in a clockwise direction of travel or a counterclockwise direction of travel.

16. The wheelbarrow of claim 15, wherein the holes of said first locking component are a series of rectangular shaped notches penetrating an outer edge of said locking component, and wherein said locking pin is a rectangular tab configured for locking engagement within one of said notches.

17. The wheelbarrow of claim 15, wherein said means for movably securing said leg assembly plate to said rear mounting bracket comprises a vertical slot communicating through said rear mounting bracket and a pin extending from said leg assembly plate, said pin slidably engaged within said vertical slot to allow said leg assembly to move vertically within said slot and to rotate in said clockwise and counterclockwise direction about said pin.

18. The wheelbarrow of claim 17, wherein the holes of said first locking component are a series of rectangular shaped notches penetrating an outer edge of said locking component, and wherein said locking pin is a rectangular tab configured for locking engagement within one of said notches.

19. The wheelbarrow of claim 15, wherein said means for movably securing said leg assembly plate to said rear mounting bracket comprises a vertical slot communicating through said leg assembly plate and a pin extending from said rear mounting bracket, said pin slidably engaged within said vertical slot to allow said leg assembly to move vertically and to rotate in said clockwise and counterclockwise direction about said pin.

20. The wheelbarrow of claim 19, wherein the holes of said first locking component are a series of rectangular shaped notches penetrating an outer edge of said locking component, and wherein said locking pin is a rectangular tab configured for locking engagement within one of said notches.

21. The wheelbarrow of claim 15, wherein said second locking component is secured to said rear mounting bracket.

* * * * *